(12) United States Patent
Uhrig

(10) Patent No.: US 6,457,483 B1
(45) Date of Patent: Oct. 1, 2002

(54) PROCESS AND FIXTURE FOR ASCERTAINING PRESSURE LOSSES

(75) Inventor: Wolfgang Uhrig, Laubach (DE)

(73) Assignee: Innovatherm Prof. Dr. Leisenberg GmbH & Co. KG, Butzbach (DE)

( * ) Notice: Subject to any disclaimer, the term of this patent is extended or adjusted under 35 U.S.C. 154(b) by 0 days.

(21) Appl. No.: 09/726,689

(22) Filed: Nov. 30, 2000

(30) Foreign Application Priority Data

Dec. 8, 1999 (DE) .......................................... 199 59 115

(51) Int. Cl.$^7$ .............................. G01M 3/28; F17D 5/06
(52) U.S. Cl. ............................... 137/15.11; 137/487.5; 137/557; 73/40.5 R; 340/605; 48/193
(58) Field of Search ....................... 137/15.11, 487.5, 137/557; 73/40, 40.5 R; 48/193; 340/605, 626

(56) References Cited

U.S. PATENT DOCUMENTS

| | | | |
|---|---|---|---|
| 3,800,586 A | * | 4/1974 | Delatorre et al. ............. 73/49.2 |
| 4,269,061 A | * | 5/1981 | Hatsuno et al. .............. 340/605 |
| 5,046,519 A | * | 9/1991 | Stenstrom et al. ............. 137/1 |
| 5,554,976 A | * | 9/1996 | Miyauchi et al. ............ 137/557 |
| 5,866,802 A | * | 2/1999 | Kimata et al. ................. 431/12 |

FOREIGN PATENT DOCUMENTS

DE    19529362 A1 * 2/1997 ........... F16L/55/16

* cited by examiner

*Primary Examiner*—Michael Powell Buij
*Assistant Examiner*—Ramesh Krishnamurthy
(74) *Attorney, Agent, or Firm*—Scott R. Foster; Pandiscio & Pandiscio, P.C.

(57) ABSTRACT

In a fixture for ascertaining pressure losses in a pressure line (3) which can be blocked for a selectable unit of time by means of shut-off valves (11, 13), in which the consumers (4, 5) are connected to the pressure line (3) and the pressure line (3) is provided with a pressure watchdog (15), the blocked pressure line (3) can have an adjustable quantity of the enclosed pressurised medium supplied into it via a branch line (24) for a unit of time, and the pressure watchdog (15) is provided with a circuit (31) by means of which the pressure line (3) can be controlled depending on the operating status of the pressure watchdog (15). By means of this embodiment, it is possible with only a very minor scope of circuitry to test the pressure line (3) at any time or at selectable time intervals and, depending on the measurement result, to resume the supply to the consumers (4, 5) or to deactivate the pressure line (3).

7 Claims, 1 Drawing Sheet

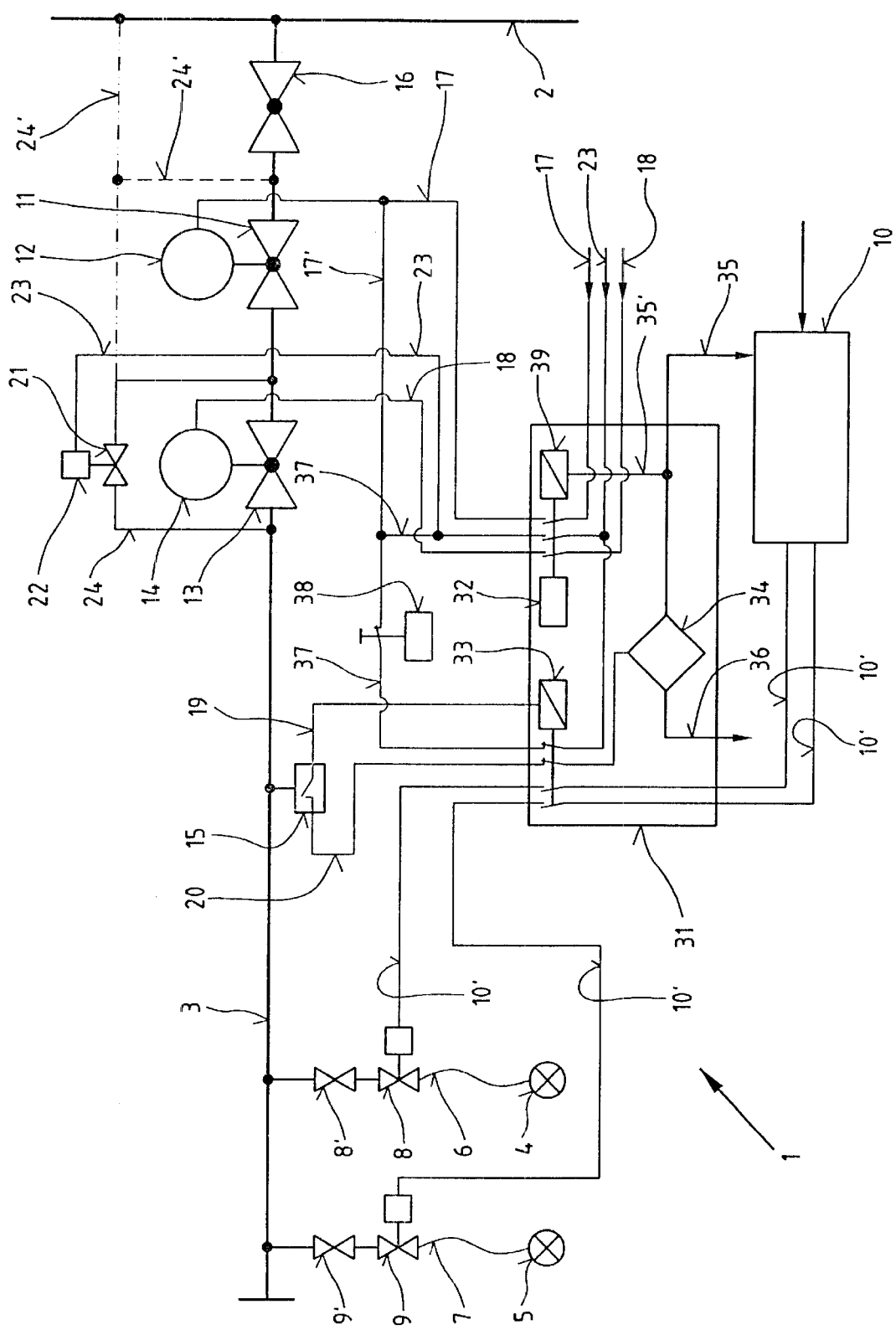

PROCESS AND FIXTURE FOR ASCERTAINING PRESSURE LOSSES

BACKGROUND OF THE INVENTION (1) Field of the Invention

The present invention relates to a process and a fixture for ascertaining pressure losses in a pressure line, in particular in a gas or heating oil line assigned to a tunnel furnace or anode furnace, in which one or more consumers are connected to the line, the medium is held enclosed within the pressure line under operating pressure for a selectable period of time and the enclosed operating pressure acts on a pressure watchdog by means of which a drop in pressure can be detected.

(2) Description of the Prior Art

A process and a fixture of prior art for application of this process are familiar from DE-19 529 362 A1. The pressure watchdog connected to the pressure line does indeed provide a reliable means of detecting a drop in pressure caused by a leak; however, there is no provision for automatic reaction according to the operating status of the pressure watchdog in this case. This means a system can only be shut off with a time lag, the result of this being that even when a leak is detected, a significant volume of fuel and thus a hazardous medium can emerge.

SUMMARY OF THE INVENTION

The purpose of the present invention is therefore to improve the process and the fixture of the aforementioned type in such a way that, although only a very minor scope of circuitry is required, the pressure line can be checked at any time or at selectable time intervals and that, depending on the measuring result, the supply to the consumers can be resumed or the pressure line deactivated. The construction work required to achieve this is intended to be kept to a small extent whilst still guaranteeing an exact measuring result.

In accordance with the present invention, the process for ascertaining pressure losses in a pressure line is characterised in that the shut-off pressure line connected to the pressure watchdog has an adjustable quantity of the enclosed medium supplied to it during a particular period of time, that the operating characteristics of the pressure watchdog are monitored during the supply of medium and that the pressure line is enabled or blocked depending on the operating position of the pressure watchdog.

It is advantageous in this case for the operating pressure of the pressure line to be reduced to the switching point of the pressure watchdog by means of the consumers prior to the supply of medium into the pressure line and for the supply of medium into the pressure line to be set using a timer switch assigned to a shut-off valve, in which case the unit of time during which the pressure line is blocked is set by one or more shut-off valves inserted in the pressure line and controlled by a time interval switch.

Furthermore, it is appropriate for the pressure watchdog connected to the pressure line to actuate a limit value switch by means of which the switching valves allocated to the consumers are controlled directly or via a governor in accordance with the operating position of the pressure watchdog.

The fixture for applying this process is characterised in that the blocked pressure line connected to the pressure watchdog can have an adjustable volume of the enclosed medium supplied to it via a branch line within a unit of time, and that the pressure watchdog is connected to a circuit by means of which the pressure line can be controlled depending on the operating status of the pressure watchdog.

In order to supply the medium into the pressure line which is blocked for a unit of time which can be selected using a time interval switch, it is advantageous for the shut-off valve adjacent to the pressure watchdog to be provided with a bypass line as a branch line, with this line being opened in a controlled fashion and connected to the pressure line or a line through which the medium is routed, and to unblock the bypass line using a timer switch. In addition, it should be possible to connect the pressure watchdog to a limit value switch by means of which the pressure line can be opened or blocked, depending on the operating status of the pressure watchdog.

If a pressure line is tested using the process described in accordance with the present invention or is equipped with a fixture for applying this process in accordance with the present invention, then it is an easy and quick matter to establish a drop in pressure in the pressure line and to react accordingly. This is namely because the pressure watchdog is reduced to its switching point by the consumers and if it does not then rise above the nominal switching point due to the supply of medium into the pressure line when the line is blocked, then this is a sign that there is an abnormal leakage present, leaks on the shut-off valves of the consumers and/or irregularities in the pulse control system. In such an eventuality, the tested portion of the pressure line must be switched off; in contrast, operation can be resumed immediately if no leakage or no other malfunction is found. Thus, with little complexity and within a short space of time, it is possible to undertake an automatic and reliable test, thereby increasing the levels of safety when working with flammable media.

BRIEF DESCRIPTION OF THE DRAWINGS

The drawing shows a sample embodiment of a fixture for ascertaining pressure losses in a pressure line, the details of which are explained below.

DESCRIPTION OF THE PREFERRED EMBODIMENTS

The system identified as 1 in the drawing consists of a pressure line 3 connected to a delivery line 2 within which gas or heating oil is pumped, with the pressure line 3 connecting to consumers 4 and 5 by means of branch lines 6 and 7. Switching valves 8 and 9 are to be connected to a governor 10 by means of lines 10' or 10" and are used for supplying the fuel to consumers 4 and/or 5, at intervals if necessary. Furthermore, one manually operated shut-off valve 8' and 9' is inserted in each of the branch lines 6 and 7 and located on the supply side of switching valves 8 and 9.

Two shut-off valves 11 and 13 are installed in pressure line 3 and are switched in a controlled fashion; electromagnets 12 and 14 or electric motors are assigned to the shut-off valves 11 and 13. The electromagnets 12 and 14 are connected to a current generator by means of lines 17 and 18. In addition, another manually operated shut-off valve is connected on the supply side of the shut-off valve 11 and a pressure watchdog 15 is connected on the outlet side of the shut-off valve 13 and connected to the pressure line 3.

In order to be able to use the pressure watchdog 15 to carry out continuous leak tests on the pressure line 3 in the area between the shut-off valve 13 and the switching valves 8 and 9 assigned to the consumers 4 and 5, a circuit 31 is provided by means of which it is possible to control the shut-off valves 11 and 13 and a switching valve 21 inserted in a bypass line 24 which serves as a branch line. The electromagnet 22 or the electric motor of the switching valve 21 can be controlled using a line 23 whilst the pressure watchdog 15 is connected to a relay 33 or a limit value switch 34 by means of lines 19 or 20 and the relay 33 or limit value switch 34 are integrated in the circuit 31. The limit value switch 34 is connected to the governor 10 and to a reactivation device 39 assigned to the time interval switch 32 by means of signal lines 35, 35' or 36; alternatively, the limit value switch 34 is connected to an alarm device which is not illustrated. Furthermore, a time switch 38 is inserted in a branch line 37 by means of which contacts inserted in lines 18 and 23 and controlled by the time interval switch 32 can be bypassed.

The leak test is conducted using the time interval switch 32 over a time period of about 2 to 3 seconds in such a way that,.when the shut-off valves 11 and 13 are closed, fuel is supplied to the consumers 4 and/or 5 causing the pressure in the pressure line 3 to fall to the switching point of the pressure watchdog 15. Switching valves 8 and 9 are then closed and, by means of the timer switch 38, the shut-off valve 11 and the switching valve 21 are opened with the result that a small volume of the medium to be combusted passes through the switching valve 21 into the blocked pressure line 3. The medium to be supplied can be removed from the part of the pressure line 3 which forms a connection between the open shut-off valve 11 and the closed shut-off valve 13, although it is also possible for the line 24 to be connected via a line 24' indicated by a dashed outline in the drawing running to the pressure line 3 between the shut-off valve 11 and the manually operated shut-off valve 16 or to connect it directly to the delivery line 2. In this case, it is possible to dispense with line 37' connecting line 37 to line 17 in order to open the shut-off valve 11.

If there are no leaks in the pressure line 3 in the area between the shut-off valve 13 and the consumers 4 and 5 or the switching valves 8 and 9 assigned to the consumers, then the pressure in the pressure line 3 will rise back above the nominal switching point of the pressure watchdog 15 within the specified unit of time and operation will be enabled by means of limit switch 34 and signal line 35. However, if there is a significant leak in the blocked-off part of the pressure line 3 and/or the switching valves 8 and 9 are leaking from their valve seats or there is an irregularity in the pulse control system, then the pressure watchdog 15 will not reach the specified nominal pressure within the predetermined time. In this case, an alarm is triggered by the limit value switch 34 and the signal line 36, and the shut-off valves 11 and 13 are not enabled.

By means of the circuit 31 and the units connected thereto, it is thus possible to undertake a continuous leak test and react immediately in the appropriate manner without having to interrupt the supply of fuel to consumers 4 and 5 for a lengthy period during the leak test.

What is claimed is:

1. A process for ascertaining pressure losses in a pressure line assigned to a tunnel furnace or anode furnace, in which one or more consumers are connected to the line, a medium is held enclosed within the pressure line under operating pressure for a selectable period of time, and an enclosed operating pressure acts on a pressure watchdog by means of which a drop in pressure can be detected, the process comprising the steps of:
connecting the pressure line to the pressure watchdog; admitting a quantity of the enclosed medium to the pressure line during a selected period of time, monitoring operating characteristics of the pressure watchdog during the admission of the medium wherein the pressure line is opened or blocked depending on an operating position of the pressure watchdog; and the pressure watchdog actuates a limit value switch by means of which switching valves allocated to the consumers are controlled in accordance with operating positions of the pressure watchdog.

2. The process in accordance with claim 1, wherein the operating pressure of the pressure line is reduced to a switching point of the pressure watchdog by means of the consumers prior to admission of medium into the pressure line.

3. The process in accordance with claim 1 wherein the admission of the medium into the pressure line is set using a timer switch assigned to a shut-off valve.

4. The process in accordance with claim 1, wherein a unit of time during which the pressure line is blocked is set by at least one shut-off valve inserted in the pressure line and controlled by a time interval switch.

5. A fixture for ascertaining pressure losses in a pressure line assigned to a tunnel furnace or anode furnace, in which the line is blocked for a selectable period of time by means of at least one controlled shut-off valve and is connected to at least one consumer, and is provided with a pressure watchdog, wherein the pressure line connected to the pressure watchdog is provided with an adjustable volume of an enclosed medium supplied to it via a branch line within a unit of time, and the pressure watchdog is connected to a circuit by means of which the pressure line is controlled depending on an operating status of the pressure watchdog, and wherein in order to supply the medium into the pressure line which is blocked for a unit of time which is selected using a time interval switch, the shut-off valve adjacent to the pressure watchdog is provided with a bypass line opened in a controlled fashion and connected to a selected one of the pressure line and a delivery line through which the medium is routed.

6. The fixture in accordance with claim 5, wherein the bypass line is unblocked using a timer switch.

7. The fixture in accordance with claim 5, wherein the pressure watchdog is connected to a limit value switch by means of which the pressure line can be opened and blocked depending on the operating status of the pressure watchdog.

\* \* \* \* \*